(12) United States Patent
Tanaka et al.

(10) Patent No.: US 6,607,859 B1
(45) Date of Patent: Aug. 19, 2003

(54) ALKALINE BATTERY SEPARATOR AND PROCESS FOR PRODUCING THE SAME

(75) Inventors: Masanao Tanaka, Ibaraki (JP); Masaki Hirooka, Ibaraki (JP); Toshiaki Takase, Ibaraki (JP)

(73) Assignee: Japan Vilene Company, Ltd., Tokyo (JP)

( * ) Notice: Subject to any disclaimer, the term of this patent is extended or adjusted under 35 U.S.C. 154(b) by 0 days.

(21) Appl. No.: 09/673,073

(22) PCT Filed: Feb. 8, 2000

(86) PCT No.: PCT/JP00/00684

§ 371 (c)(1),
(2), (4) Date: Oct. 10, 2000

(87) PCT Pub. No.: WO00/46866

PCT Pub. Date: Aug. 10, 2000

(30) Foreign Application Priority Data

Feb. 8, 1999 (JP) .............................. 11-029805

(51) Int. Cl.$^7$ .............................................. H01M 10/04
(52) U.S. Cl. ........................................ 429/145; 429/147
(58) Field of Search ................................ 429/129, 145, 429/146, 147

(56) References Cited

U.S. PATENT DOCUMENTS

| 6,037,079 | A  | * | 3/2000 | Tanaka et al. | ............... | 429/142 |
| 6,096,456 | A  | * | 8/2000 | Takeuchi et al. | ............ | 429/249 |
| 6,348,286 | B1 | * | 2/2002 | Tanaka et al. | ............... | 429/247 |
| 6,355,375 | B2 | * | 3/2002 | Tanaka et al. | ............... | 429/142 |

FOREIGN PATENT DOCUMENTS

| EP | 0848436 | 6/1998 | ............ H01M/2/16 |
| EP | 0975032 | 6/1999 | |

* cited by examiner

Primary Examiner—Randy Gulakowski
Assistant Examiner—M. Wills
(74) Attorney, Agent, or Firm—Darby & Darby

(57) ABSTRACT

An alkaline battery separator which enables the preparation of a battery with a good yield and workability is provided. The alkaline battery separator of the present invention comprises a fiber sheet mainly comprising hydrophilicity-imparted polyolefin fibers having a fiber diameter of 8 $\mu$m or more, and a part of the hydrophilicity-imparted polyolefin fibers is composed of high-strength fibers having a tensile strength of 5 g/d or more.

11 Claims, No Drawings

ALKALINE BATTERY SEPARATOR AND PROCESS FOR PRODUCING THE SAME

TECHNICAL FIELD

The present invention relates to an alkaline battery separator and a process for producing the same.

BACKGROUND ART

In an alkaline battery, a separator is used to separate a positive electrode and a negative electrode from each other to prevent a short circuit therebetween, and further, to hold an electrolyte thereon and provide a smooth electromotive reaction.

Recently, in electronic equipment, the space allotted for the alkaline battery has been reduced due to the need for miniaturization and weight-saving. Nevertheless, the performance requirement for such a smaller alkaline battery is the same as or higher than that for a conventional battery, and therefore, it is necessary to increase the capacity of the, battery, and also increase the amounts of active materials in the electrodes. Thus, the volume allotted in the battery for the separator must be reduced, the thickness of the separator must be reduced thinner, and electrodes and separators must be placed in close contact to prevent the formation of a space therebetween when an electrodes-group is produced. Nevertheless, when thinner separators are used, and a strong tension is applied to ensure the close contact between the electrodes and separators, any flash occurring at the electrode can puncture the separator and cause a short circuit, an edge of the electrode might then tear the separator, and thus lower the yield.

Japanese Unexamined Patent Publication (Kokai) No. 7-29561 or Japanese Unexamined Patent Publication (Kokai) No. 8-138645, for example, disclose that fine fibers having a small diameter, for example, approximately 5 $\mu$m, are used to make the separator thinner. Nevertheless, the separator obtained from such fine fibers lacks stiffness and is easily wrinkled when an electrodes-group is produced. Because the separator has a high density, it is difficult to diffuse a poured electrolyte into the separator, and thus, the handling characteristics are poor when an electrodes-group is produced.

The inventors of the present invention made an intensive investigation of an alkaline battery separator which can remedy the above disadvantages of prior art, and can be manufactured in a good yield with a good workability. As a result, the inventors found that when a separator mainly comprising hydrophilicity-imparted, relatively thick and stiff polyolefin fibers having a fiber diameter of 8 $\mu$m or more wherein a part of the hydrophilicity-imparted polyolefin fibers of high-strength fibers having a tensile strength of 5 g/d or more is used, a short circuit caused by a puncturing of the separator by a flash occurring at the electrode is avoided, and the separator is not torn by an edge of an electrode. Further, a battery can be stably produced in a good yield with a good workability, while the separator has the desired stiffness and is not wrinkled. Further, the present inventors also found that the separator mainly comprising hydrophilicity-imparted, relatively thick and stiff polyolefin fibers having a fiber diameter of 8 $\mu$m or more can provide spaces sufficient for holding an electrolyte, and the property required to diffuse a poured electrolyte is excellent.

Accordingly, the object of the present invention is to provide an alkaline battery separator which can be produced in a good yield with a good workability, and a process for producing the same.

DISCLOSURE OF INVENTION

The present invention relates to an alkaline battery separator characterized in that the separator comprises a fiber sheet mainly comprising hydrophilicity-imparted polyolefin fibers having a fiber diameter of 8 $\mu$m or more is contained, and a part of the hydrophilicity-imparted polyolefin fibers is composed of high-strength fibers having a tensile strength of 5 g/d or more. The alkaline battery separator of the present invention will be sometimes referred to as simply a "separator" hereinafter.

Further, the present invention also relates to a process for producing an alkaline battery separator comprising the steps of:

forming a fiber sheet from polyolefin fibers which have a fiber diameter of 8 $\mu$m or more and contain polyolefin high-strength fibers having a fiber diameter of 8 $\mu$m or more and a tensile strength of 5 g/d or more; and then imparting a hydrophilic property to the resulting fiber sheet.

BEST MODE FOR CARRYING OUT THE INVENTION

The present invention will be explained in detail hereinafter.

A fiber sheet forming the alkaline battery separator of the present invention mainly comprises polyolefin fibers which have a fiber diameter of 8 $\mu$m or more and are treated to impart a hydrophilic property (i.e., hydrophilicity-imparted polyolefin fibers). Because the fiber sheet mainly comprises hydrophilicity-imparted polyolefin fibers, it has a high alkali resistance. Further, the fiber sheet has an excellent electrolyte-holding capacity, because it is treated to impart a hydrophilic property. The expression "mainly comprise" as used herein means that the subject fibers, i.e., hydrophilicity-imparted polyolefin fibers having a fiber diameter of 8 $\mu$m or more, account for more than 75 mass %, preferably 80 mass % or more, more preferably 85 mass % or more, more preferably 90 mass % or more, more preferably 95 mass % or more, most preferably 100 mass %, with respect to constituent fibers of the fiber sheet.

The polyolefin fibers before the treatment for imparting a hydrophilic property may contain a resin component, for example, polymers from monomers, such as propylene, ethylene, butene, or methyl pentene, copolymers of two or more kinds of the monomers as above, or copolymers of the above monomers and vinyl alcohol, acrylic acid or methacrylic acid, such as ethylene-vinyl alcohol copolymers, ethylene-acrylic acid copolymers, or ethylene-methacrylic acid copolymers. The polyolefin fiber may be composed of one kind of a resin component as above, or may be a composite fiber comprising two or more resin components as above. As the composite fiber, there may be mentioned, for example, a composite fiber whose sectional shape is a sheath-core type, a side-by-side type, an eccentric type, an islands-in-sea type, an orange type or a multiple bimetal type.

A fiber diameter of each fiber of the hydrophilicity-imparted polyolefin fibers contained as the main component in the fiber sheet forming the alkaline battery separator of the present invention is not limited, as long as it is 8 $\mu$m or more. However, it is preferably 9 $\mu$m or more, more preferably 10 $\mu$m or more, more preferably 10.5 $\mu$m or more, more preferably 11 $\mu$m or more, more preferably 12 $\mu$m or more, more preferably 12.5 $\mu$m or more, most preferably 13 $\mu$m or more. For a fiber having a non-circular sectional shape, a diameter of a circle having an area the same as that of the non-circular sectional shape is regarded as a diameter in the present specification.

Because the fiber sheet forming the alkaline battery separator of the present invention mainly comprises relatively thick hydrophilicity-imparted polyolefin fibers as above, i.e., hydrophilicity-imparted polyolefin fibers having a required stiffness, the fiber sheet has a good stiffness, a good workability, and an excellent compression elasticity. Therefore, a short circuit caused between electrodes by a puncturing of the separator by a flash occurring on the electrode is avoided, a separator is not torn by an edge of an electrode, and a battery can be stably produced in a good yield. Further, the fiber sheet forming the alkaline battery separator of the present invention mainly comprises relatively thick, i.e., stiff, hydrophilicity-imparted polyolefin fibers having a fiber diameter of 8 μm or more, and can maintain spaces sufficient for holding an electrolyte. Therefore, the fiber sheet has an excellent property required to diffuse a poured electrolyte, that is, the poured electrolyte can be rapidly diffused all over the battery. The upper limit of the fiber diameter is not limited, but preferably is approximately 30 μm. When the fiber diameter is 30 μm or less, the electrolyte-holding capacity is not lowered.

Embodiments of the fiber sheet forming the alkaline battery separator of the present invention are not limited, as long as the fiber sheet mainly comprises hydrophilicity-imparted polyolefin fibers. The fiber sheet may be, for example, a woven fabric, a knitted fabric, or a non-woven-fabric, or a composite fabric thereof. Of these fiber sheets, a fiber sheet containing the non-woven fabric is preferable, because fibers may be placed three-dimensionally, and it has an excellent electrolyte-holding capacity.

The fiber sheet which is a constituent component of the alkaline battery separator of the present invention contains, as a part of hydrophilicity-imparted polyolefin fibers, hydrophilicity-imparted polyolefin high-strength fibers having a tensile strength of 5 g/d or more, preferably 7 g/d or more, more preferably 9 g/d or more, most preferably 12 g/d or more; 50 g/d or less is appropriate. The hydrophilicity-imparted polyolefin high-strength fiber will be sometimes referred to as "high-strength fiber" hereinafter. The fiber sheet may contain only one kind of the high-strength fibers, or two or more kinds of the high-strength fibers. The fiber sheet contains the high-strength fibers, and thus a separator will not be punctured by a flash occurring on the electrode or torn by an edge of an electrode when an electrodes-group is produced. The electrodes-group can be produced in a good yield. The fiber sheet containing the high-strength fibers has a desired stiffness, and thus is not wrinkled and has a good workability. The term "tensile strength" of fibers as used herein means a value measured in accordance with JIS L1015 (Japanese Industrial Standard), a testing method for man-made staple fibers.

The high-strength fibers may be composed of resins such as polypropylene or ultra-high-molecular-weight polyethylene. The term "ultra-high-molecular-weight" as used herein with regard to "ultra-high-molecular-weight polyethylene" means that a weight-average molecular weight thereof is 1,000,000 or more. The weight-average molecular weight of the ultra-high-molecular-weight polyethylene is generally 1,000,000 to 5,000,000. These high-strength fibers may be obtained commercially and are readily available.

The high-strength fibers may be composed of such a resin component alone, i.e., only one kind of a resin component, or may be obtained by mixing or combining two or more resin components. A sectional shape of the latter composite high-strength fibers is, for example, a sheath-core, eccentric, laminate, islands-in sea, orange, or multibimetal type. The composite high-strength fibers from two or more resin components as above is preferable, because such fibers can be fused with a resin component forming the surface of fibers and the 5% modulus strength can be improved. Further, high-strength fibers which can be fused with a resin component forming the whole surface of fibers, for example, sheath-core, eccentric, or islands-in sea type high-strength fibers are preferable, particularly sheath-core type high-strength fibers are more preferable. As the preferable sheath-core type high-strength fibers, sheath-core type high-strength fibers containing a polypropylene resin or ultra-high-molecular-weight polyethylene as a core component and a polyethylene resin having a lower melting point than that of the core component resin as a sheath component is most preferable, because the melting points between the core and sheath components is high, and the tensile strength of the high-strength fibers can be maintained. As described above, the high-strength fibers may be fusible high-strength fibers or non-fusible high-strength fibers.

A fiber diameter of each fiber of the high-strength fibers is not limited, as long as it is 8 μm or more. Approximately 8 to 30 μm is preferable, approximately 9 to 22 μm is more preferable, approximately 10 to 22 μm is more preferable, approximately 10.5 to 22 μm is more preferable, approximately 11 to 22 μm is more preferable, approximately 12 to 22 μm is more preferable, approximately 12.5 to 22 μm is more preferable, approximately 13 to 22 μm is more preferable, and approximately 13 to 18 μm is most preferable. When the fiber diameter of the high-strength fibers is approximately 8 to 30 μm, a short circuit caused during the production of the electrodes-group is effectively prevented, an excellent resistance to tearing is obtained, and an electrolyte-holding capacity and a property required to diffuse a poured electrolyte are not lowered.

A fiber length of the high-strength fibers contained in the fiber sheet, preferably in the fiber sheet containing the non-woven fabric, is preferably 1 to 60 mm, more preferably 3 to 25 mm, most preferably 5 to 20 mm. When the fiber length of high-strength fibers is 1 to 60 mm, a fiber sheet having the maximum pore diameter of 50 μm or less, preferably a fiber sheet wherein pores having a pore diameter of 30 μm or less account for 95% or more with respect to the whole of pores, may be easily prepared. When the maximum pore diameter in the fiber sheet is 50 μm or less, preferably when pores having a pore diameter of 30 μm or less therein account for 95% or more with respect to the whole of pores, powdery active materials which may fall from the electrodes cannot easily penetrate into inner spaces of the separator when the separator is heavily pressed against the electrode, and thus a short circuit rarely occurs.

The fiber sheet preferably contains 10 mass % or more, more preferably 20 mass % or more, most preferably 30 mass % or more of the high-strength fibers. When the fiber sheet contains 10 mass % or more of high-strength fibers, a short circuit caused during the production of the electrodes-group is effectively prevented, an excellent resistance to tearing is obtained, and required stiffness also obtained.

In addition to the above high-strength fibers, the fiber sheet forming the alkaline battery separator of the present invention may contain hydrophilicity-imparted polyolefin fusible fibers which can be fused with each other and have a tensile strength of less than 5 g/d, i.e., hydrophilicity-imparted polyolefin fusible low-strength fibers (hereinafter referred to as "fusible fibers"), as one of other fibers. The fiber sheet may contain only one kind of the fusible fibers, or two or more kinds of the fusible fibers. When the fiber sheet contains fusible fibers, a tensile strength or stiffness of the fiber sheet is improved, and thus the workability is also improved. Therefore, the battery can be produced in a good yield, without breaking upon the production of the electrodes-group. The fusible fiber preferably contains, as a component forming at least a fiber surface, a fusible component having a melting point lower than that of the high-strength fiber, preferably lower by 10° C. or more, more preferably lower by 15° C. or more. If the high-strength fiber contains two or more resin components, the melting point thereof means the highest melting point. In this case, the tensile strength of the high-strength fibers is not lowered.

When the high-strength fibers comprise polypropylene or ultra-high-molecular-weight polyethylene, there may be mentioned, as the fusible component, for example, polyethylene resins, for example, low-density polyethylene, linear low-density polyethylene, high-density polyethylene, or polyethylene copolymers, such as ethylene-acrylic acid copolymer or ethylene-methacrylic acid copolymer.

The fusible fibers may be composed of the above resin component alone, or preferably may be composed of two or more resin components wherein a fusible component is exposed on the surface of fibers, because a fibrous shape can be maintained by resin components other than the fusible component. When the fusible fiber is composed of two or more resin components, a sectional shape of the fusible fiber may be, for example, a sheath-core, eccentric, side-by-side, islands-in sea, multibimetal, or orange type. The fusible fibers may be easily spun in accordance with, for example, a composite spinning method or a mixing spinning method, or a combination thereof, or are commercially and easily available. When the fusible fiber contains two or more resin components, resin components other than the fusible component are not limited, as long as the resin components other than the fusible component have a melting point higher than that of the fusible component, preferably higher by 10° C. or more, more preferably higher by 20° C. or more.

A fiber diameter of each fiber of the fusible fibers is not limited, as long as it is 8 $\mu$m or more. Approximately 8 to 30 $\mu$m is preferable, approximately 9 to 22 $\mu$m is more preferable, approximately 10 to 22 $\mu$m is more preferable, approximately 10.5 to 22 $\mu$m is more preferable, approximately 11 to 22 $\mu$m is more preferable, approximately 12 to 22 $\mu$m is more preferable, approximately 12 to 18 $\mu$m is more preferable, approximately 12.5 to 18 $\mu$m is more preferable, and approximately 13 to 18 $\mu$m is most preferable. When the fiber diameter of fusible fibers is approximately 8 to 30 $\mu$m, the electrolyte-holding capacity is not lowered.

When the fiber sheet forming the separator contains the high-strength fibers (including the fusible high-strength fibers and/or the non-fusible high-strength fibers) and the fusible fibers, the fiber diameter of the high-strength fibers is preferably equal to or longer than that of the fusible fibers, more preferably 1 to 2 fold, most preferably 1 to 1.6 fold, as this enables appropriate spaces for a sealed-type alkaline battery separator to be formed.

A fiber length of the fusible fibers contained in the fiber sheet (preferably the fiber sheet containing the non-woven fabric) is preferably 1 to 60 mm, more preferably 3 to 25 mm, most preferably 5 to 20 mm, because it is thus easy to prepare a fiber sheet wherein the maximum pore diameter of the fiber sheet is 50 $\mu$m or less, or preferably pores having a pore diameter of 30 $\mu$m or less in the fiber sheet account for 95% or more with respect to the whole of pores.

The fiber sheet preferably contains 20 mass % or more, more preferably 30 mass % or more, of fusible fibers. When the fiber sheet contains 20 mass % or more of fusible fibers, the tensile strength or stiffness of the separator is improved. The fiber sheet preferably contains 20 mass % or more, more preferably 30 mass % or more, of fibers having fusibility (including the fusible fibers and/or fusible high-strength fibers).

When fibers forming the fiber sheet contain the non-fusible high-strength fibers and the fusible fibers, the mass ratio of the non-fusible high-strength fibers and the fusible fibers is preferably 10 to 50:90 to 50, more preferably 20 to 40:80 to 60, most preferably 30 to 40:70 to 60.

When the fiber sheet contains the fusible high-strength fibers, the fusible high-strength fibers preferably account for 10 mass % or more of the fiber sheet.

The fiber sheet forming the alkaline battery separator of the present invention may further contain fibers other than the above high-strength fibers or the above fusible fibers. For example, the fiber sheet may further contain non-fusible polyolefin fibers having a tensile strength of less than 5 g/d and treated to impart a hydrophilic property, i.e., hydrophilicity-imparted polyolefin non-fusible low-strength fibers. Hereinafter referred to as "non-fusible low-strength fibers". The fiber sheet may contain a kind of non-fusible low-strength fibers, or two or more kinds of non-fusible low-strength fibers. A fiber diameter of each fiber of the non-fusible low-strength fibers is not limited, as long as it is 8 $\mu$m or more. Approximately 8 to 30 $\mu$m is preferable, approximately 9 to 22 $\mu$m is more preferable, approximately 10 to 22 $\mu$m is more preferable, approximately 10.5 to 22 $\mu$m is more preferable, approximately 11 to 22 $\mu$m is more preferable, approximately 12 to 22 $\mu$m is more preferable, approximately 12 to 18 $\mu$m is more preferable, approximately 12.5 to 18 $\mu$m is more preferable, and approximately 13 to 18 $\mu$m is most preferable. When the fiber diameter is approximately 8 to 30 $\mu$m, the electrolyte-holding capacity is not lowered.

In the fiber sheet forming the alkaline battery separator of the present invention, it is preferable that polyethylene fibers wherein the surface thereof consists essentially of polyethylene resins account for 60 mass % or more, more preferably 65 mass % or more, most preferably 70 mass % or more, of the hydrophilicity-imparted polyolefin fibers (i.e., the high-strength fibers, the fusible fibers, and /or the non-fusible low-strength fibers) forming the fiber sheet. This is because the treatment for imparting a higher degree of the hydrophilicity can be more easily carried out, and thus an excellent electrolyte-holding capacity is obtained, and therefore, a battery having a long lifetime can be produced. As the polyethylene resin, there may be mentioned, for example, low-density polyethylene, linear low-density polyethylene, high-density polyethylene, ultra-high-molecular-weight polyethylene, or polyethylene copolymers, such as ethylene-acrylic acid copolymer or ethylene-methacrylic acid copolymer.

The maximum pore diameter in the fiber sheet (preferably the fiber sheet containing the non-woven fabric) forming the alkaline battery separator of the present invention is preferably 50 $\mu$m or less, more preferably 45 $\mu$m or less, most preferably 40 $\mu$m or less. When the maximum pore diameter is 50 $\mu$m or less, powdery active materials which may fall from the electrodes cannot easily penetrate into inner spaces of the separator, when the separator is heavily pressed against the electrode, and thus a short circuit rarely occurs. The term "maximum pore diameter" as used herein means a value measured in accordance with a bubble point method, using a porometer (Coulter Electronics Ltd.).

The maximum pore diameter of 50 μm or less in the fiber sheet can be obtained by adjusting various factors, for example, a fineness of each fiber (including the high-strength fibers) forming the fiber sheet, a fiber length of each fiber (including the high-strength fibers) forming the fiber sheet, a degree of fusions when the fusible high-strength fibers and/or fusible fibers are fused, a sectional shape of each fiber forming the fiber sheet, a mass per unit area of the fiber sheet, a thickness of the fiber sheet, and so on.

A 5% modulus strength with respect to at least a direction of the fiber sheet (preferably a fiber sheet containing a non-woven fabric) forming the alkaline battery separator of the present invention is preferably a 60 N/5 cm width or more, more preferably a 70 N/5 cm width or more, most preferably a 80 N/5 cm width or more. When the 5% modulus strength is a 60 N/5 cm width or more, a distortion of the separator may be avoided, and a change of each pore size in the separator may be small, even if the separator is strongly pressed against the electrodes. Further, powdery active materials which may fall from the electrodes cannot easily penetrate into inner spaces of the separator, and thus a short circuit rarely occurs. The term "5% modulus strength" as used herein means a force required to extend a separator by 5 mm, by pulling a fiber sheet (for example, a non-woven fabric) cut to a 5 cm width which has been set between chucks (distance between the chucks=100 mm) of a tensile tester (TENSILON UTM-III-100; manufactured by ORIENTEC, Co.), at a pulling rate of 300 mm/min.

The 5% modulus strength of the fiber sheet can be made a 60 N/5 cm width or more, by adjusting various factors, for example, a fineness of each fiber (including the high-strength fibers) forming the fiber sheet, a fiber length of each fiber (including the high-strength fibers) forming the fiber sheet, an orientation of fibers (including the high-strength fibers) forming the fiber sheet, a degree of fusing when the fusible high-strength fibers and/or fusible fibers are fused, a degree of entanglement of fibers forming the fiber sheet, and so on.

In the fiber sheet, preferably a fiber sheet containing a non-woven fabric, forming the alkaline battery separator of the present invention, pores having a pore diameter of 30 μm or less preferably account for 95% or more of the whole pores in the fiber sheet, more preferably 100%, i.e., all of the pores have a pore diameter of 30 μm or less. When pores having a pore diameter of 30 μm or less account for 95% or more of the whole pores in the fiber sheet, powdery active materials falling from the electrodes cannot easily penetrate into inner spaces of the separator, and thus a short circuit is rarely occurs even if the separator is strongly pressed against the electrodes. The "ratio of pores having a pore diameter of 30 μm or less of the whole pores" in the present specification may be calculated by measuring a pressure of gas (nitrogen gas) in accordance with a bubble point method, calculating a pore diameter in accordance with a Washburn equation, and calculating a distribution of the pore diameter from a flow of the gas.

The fiber sheet wherein the pores having a pore diameter of 30 μm or less account for 95% or more of the whole pores can be obtained by adjusting various factors, for example, a fineness of each fiber (including the high-strength fibers) forming the fiber sheet, a fiber length of each fiber (including the high-strength fibers) forming the fiber sheet, a degree of fusing when the fusible high-strength fibers and/or fusible fibers are fused, a sectional shape of each fiber forming the fiber sheet, a mass per unit area of the fiber sheet, a thickness of the fiber sheet, and so on.

The fiber sheet (preferably a fiber sheet containing a non-woven fabric) forming the alkaline battery separator of the present invention has an air permeability of, preferably 4 cm/sec or more, more preferably 6 cm/sec or more, most preferably 8 cm/sec or more. The upper limit of the air permeability of the fiber sheet is not limited, but is preferably 50 cm/sec or less. When the air permeability is 4 cm/sec or more, gas generated in one electrode can easily migrate to the other electrode, and thus the separator having an air permeability of 4 cm/sec or more may be preferably used in a sealed-type alkaline battery. The term "air permeability" as used herein means a value measured in accordance with the method defined in JIS L 1096 (1999) [8.27.1 A method (Frazir method)].

The fiber sheet having an air permeability of 4 cm/sec or more can be obtained by adjusting various factors, for example, a fineness of each fiber (including the high-strength fibers) forming the fiber sheet, a fiber length of each fiber (including the high-strength fibers) forming the fiber sheet, a degree of fusing when the fusible high-strength fibers and/or fusible fibers are fused, a degree of entanglement of fibers forming the fiber sheet, a mass per unit area of the fiber sheet, a thickness of the fiber sheet, and so on.

An electrical resistance of the fiber sheet (preferably a fiber sheet containing a non-woven fabric) forming the alkaline battery separator of the present invention is preferably 5 mΩ·100 cm$^2$/sheet or less, more preferably 3 mΩ·100 cm$^2$/sheet or less, most preferably 2 mΩ·100 cm$^2$/sheet or less. The lower limit of the electrical resistance of the fiber sheet is not limited, but is preferably $10^{-3}$ mΩ·100 cm$^2$/sheet or more. When the electrical resistance is 5 mΩ·100 cm$^2$/sheet or less, an inner resistance of the alkaline battery is reduced, and therefore, a battery having an excellent battery capacity and charge-discharge characteristics may be obtained.

The fiber sheet having an electrical resistance of 5 mΩ·100 cm$^2$/sheet or less can be obtained, for example, by increasing a void volume rate to enlarge spaces capable of holding an electrolyte; locating hydrophilic groups, such as a sulfonic acid, hydroxyl, or carboxyl group, on the surface of fibers forming the fiber sheet; thinning a thickness of the separator; or the like.

The term "electrical resistance" as used herein means a value obtained in accordance with the procedure concretely disclosed in Examples as below, using a test equipment disclosed in JIS C2313 (Separator for a lead secondary battery), 7.2.4 Electrical Resistance, 3. Test Equipment.

A process for producing the fiber sheet forming the alkaline battery separator of the present invention is not limited, but the fiber sheet may be prepared, for example, (1) by forming a fiber sheet from hydrophilicity-imparted polyplef in fibers obtained by imparting a hydrophilic property to polyolefin fibers; (2) carrying out fiber sheet forming steps to any intermediate step where a step to impart a hydrophilic property is carried out, and then performing the remaining steps to obtain a fiber sheet; or (3) forming a fiber sheet from polyolefin fibers to which a hydrophilic property had not been imparted, and imparting a hydrophilic property to the resulting fiber sheet. Because fibers are not damaged during the preparation of a fiber sheet, it is preferable to prepare the separator by the method wherein the treatment to impart a hydrophilic property is carried out after forming the fiber sheet. An embodiment wherein a fiber sheet is composed of a non-woven fabric, and a hydrophilic property is imparted after forming the fiber sheet will be described hereinafter. However, a treatment to impart a hydrophilic property may be carried out as in the following embodiment, for the fibers before forming the fiber sheet, or at any intermediate step during the formation of the fiber sheet.

A non-woven fabric preferable as a fiber sheet may be prepared from, for example, polyolefin fibers having a fiber diameter of 8 μm or more and containing polyolefin high-strength fibers having a fiber diameter 8 μm or more and a tensile strength of 5 g/d or more, in accordance with a method wherein a fiber web is formed by a dry-laid method, such as a carding method, an air-laid method, a spun-bonding method, or a melt-blown method, or a wet-laid method, and then entangled by a fluid jet, such as a water jet; a method wherein fusible fibers and/or fusible high-strength fibers are mixed in a fiber web and fused; or a method wherein a web is bonded with a binder; or a combination thereof.

When a non-woven fabric having a maximum pore diameter of 50 μm or less is prepared, preferably a non-woven fabric wherein pores having a pore diameter of 30 μm or less account for 95% or more with respect to the whole pores is prepared, the wet-laid method is preferable for forming the fiber web. As the wet-laid method, there may be mentioned conventional methods, such as a flat long-wire type, a flat short-wire type, an inclined long-wire type, an inclined short-wire type, a cylinder type, a long-wire cylinder combination type, or a short-wire-cylinder combination type. When the fiber web is formed by the wet-laid method, the resulting non-woven fabric has a tendency to show a lower 5% modulus strength. Therefore, it is preferable that fibers are orientated in a nearly unidirectional manner by adjusting a moving rate of a net for laying fibers and an amount of a slurry flow so as to obtain a separator showing a 5% modulus strength of a 60 N/5 cm width or more at least a direction thereof.

A method for entangling fibers may be, for example, a method for ejecting a fluid jet, particularly a water jet, to a fiber web. The method for ejecting a fluid jet is preferable, because a degree of entanglement is high, a 5% modulus strength of the separator is high, and a whole fiber web can be uniformly entangled.

Specifically, a fluid jet under a pressure of 1 to 30 MPa may be ejected onto a fiber web from a nozzle plate containing one or more lines of nozzles having a diameter of 0.05 to 0.3 mm and a pitch of 0.2 to 3 mm. The fluid jet may be applied to one side or both sides of the fiber web, once or more times. If a supporter, such as a net, to carry a fiber web thereon when treated with the fluid jet contains thick supporting portions (non-opening portions), the resulting separator contains pores having a large diameter, and a short circuit is liable to occur. Therefore, it is preferable to use a supporter which contains supporting portions having a thickness of 0.25 mm or less.

Of the above-mentioned known methods for preparing a non-woven fabric, a preferable method comprises mixing fusible fibers and/or fusible high-strength fibers in a fiber web, and fusing the fusible fibers and/or fusible high-strength fibers in such a manner that a tensile strength and stiffness of the resulting non-woven fabric are improved. Namely, a tensile strength and stiffness of the resulting non-woven fabric are improved by the above method. The fiber web used may be composed of a single layer or multiple layers of same or different fiber webs. For example, a non-woven fabric having a tensile strength and uniformity can be prepared from a laminated fiber web comprising a fiber web prepared by a dry-laid method and a fiber web prepared by a wet-laid method.

The fusing treatment can be carried out under pressure or without pressure, or first without pressure to fuse the fusible component and then under pressure. When the fusing treatment is carried out without pressure, it is preferably carried out within the range of from a softening temperature of the fusible component in fusible fibers and/or fusible high-strength fibers to a temperature which is 20° C. higher than a melting point of the fusible component. When the fusing treatment is carried out under pressure, it is preferably carried out within the range of from a softening temperature to a melting point of the fusible component in fusible fibers and/or fusible high-strength fibers. The fusing treatment may be carried out by a heating-calender, a hot-air through-type heater, or a cylinder contact heater. A linear pressure applied when a heat is applied under pressure, or when a heat is applied first and thereafter a pressure is applied, is preferably approximately 5 to 30 N/cm. The term "melting point" as used herein means a temperature of a maximum value in a melting-endothermic curve obtained by raising the temperature from room temperature at a rate of 10° C./min, using a differential scanning calorimeter. Further, the term "softening point" as used herein means a temperature of a starting point in a melting-endothermic curve obtained by raising the temperature from room temperature at a rate of 10° C./min, using a differential scanning calorimeter.

The entangling treatment or the fusing treatment may be carried out in an alternative manner, or the entangling treatment and the fusing treatment may be used in combination thereof, to enhance the 5% modulus strength of the separator. Further, the number of the entangling and/or fusing treatments to be carried out, and the sequential order of the entangling and/or fusing treatments are not limited. It is preferable to carry out first the entangling treatment and then the fusing treatment, because a fused structure formed by the fusing treatment cannot be then destroyed by the entangling treatment. In this case, a highly entangled structure is fused, and thus a 5% modulus strength is further improved.

The treatment used for imparting a hydrophilic property may be, for example, a sulfonating treatment, a treatment with fluorine gas, a graft polymerization treatment with vinyl monomers, a treatment with a surface-active agent, a discharging treatment, or a treatment to adhere hydrophilic resins.

The sulfonating treatment contains, for example, but is not limited to, a treatment with fuming sulfuric acid, sulfuric acid, sulfur trioxide, chlorosulfuric acid, or sulfuryl chloride. Of these treatments, the sulfonating treatment with fuming sulfuric acid is preferable, because of a high reactivity and an easier sulfonation is thus obtained. Sulfonic acid groups may be introduced into polyolefin fibers by the sulfonating treatment.

The treatment with fluorine gas includes, for example, but is not limited to, the treatment with a gas mixture of fluorine gas diluted with an inactive gas (such as nitrogen, argon, or helium gas) and at least one gas selected from a group consisting of oxygen, carbon dioxide and sulfur dioxide gases. Fluorine, oxygen, or sulfur atoms, or functional groups containing these atoms (such as a sulfonic acid group) may be introduced into polyolefin fibers by the treatment with fluorine gas.

Examples of the vinyl monomer which may be used in the graft polymerization treatment are acrylic acid, methacrylic acid, acrylate, methacrylate, vinyl pyridine, vinyl pyrrolidone, or styrene. Acrylic acid has a good affinity with an electrolyte and may be preferably used.

The vinyl monomers can be polymerized, for example, by dipping the non-woven fabric in a solution containing the vinyl monomers and an initiator, and heating; by coating the non-woven fabric with vinyl monomers and applying radiation; by applying radiation to the non-woven fabric and then bringing the non-woven fabric into contact with the vinyl monomers; by impregnating the non-woven fabric with a solution containing vinyl monomers and a sensitizing agent, and applying ultraviolet rays. The graft polymerization can be effectively carried out by modifying the surface of fibers with ultraviolet radiation, a corona discharge or a plasma discharge before bringing the non-woven fabric into contact with the vinyl monomer solution, to enhance the affinity thereof with the vinyl monomer solution. When the vinyl monomers are polymerized by applying radiation or ultraviolet radiation, it is preferable to apply radiation or ultraviolet radiation first in the presence of oxygen, but subsequently under the condition that the non-woven fabric is surrounded by an air-nonpermeable film or the condition that all the [1 surfaces of the non-woven fabric are covered over with an air-nonpermeable film, i.e., the condition that oxygen is not excluded. This improves a resistance to oxidation.

The treatment with a surface-active agent may be carried out by applying, for example, spraying or coating, a solution of an anionic surface-active agent (such as an alkali metal-salt of a higher fatty acid, alkyl sulfonate, or a salt of sulfosuccinate) or a nonionic surface-active agent (such as polyoxyethylene alkyl ether, or polyoxyethylene alkylphenol ether) to the non-woven fabric, or dipping the non-woven fabric in the solution.

As the discharging treatment, there may be mentioned, for example, treatments with a corona discharge, plasma, glow discharge, surface discharge, or electron rays. Of the discharging treatments, the plasma treatment comprising the steps of placing the non-woven fabric between a pair of electrodes carrying a dielectric layer respectively in air under an atmospheric pressure, so that the non-woven fabric is brought into contact with both dielectric layers, and then applying an alternating current voltage between the electrodes to thereby induce an electric discharge in internal voids contained in the non-woven fabric, can be preferably conducted. This is because not only the outer surfaces but also the insides of the non-woven fabric can be thus modified; and therefore, a battery having an excellent electrolyte-holding capacity in the separator, and an excellent inner pressure characteristic in an excellent oxygen-absorbability upon overcharging can be produced.

The treatment to adhere hydrophilic resins can be carried out by adhering hydrophilic resins, such as carboxymethyl cellulose, polyvinyl alcohol, polyvinyl alcohol which is cross-linkable, or polyacrylic acid, to the non-woven fabric. The hydrophilic resins may be adhered to the non-woven fabric by spraying or coating the non-woven fabric with a solution prepared by dissolving or dispersing the hydrophilic resins in an appropriate solvent, or dipping the non-woven fabric in the solution, and then drying. The amount of the hydrophilic resins adhered is preferably 0.1 to 5 mass % with respect to an amount of the whole separator after adherence. In this case, the air permeability is not affected.

The polyvinyl alcohol which is cross-linkable, for example, polyvinyl alcohol substituted by a photosensitive group at a part of hydroxy groups, particularly polyvinyl alcohol having styryl pyridinium, styryl quinolinium, or styryl benzthiazolinium groups as the photosensitive group. The cross-linkable polyvinyl alcohol can be cross-linked as in the case of other hydrophilic resins, i.e., by adhering to the non-woven fabric and irradiating with light. The polyvinyl alcohol substituted by a photosensitive group at a part of hydroxy groups has an excellent resistance to alkalis and contains many hydroxyl groups, and thus can form chelates with ions before the ions are deposited on electrodes in the form of branches, during charging and/or discharging, to thereby effectively prevent a short circuit between the electrodes.

The mass per unit area of the alkaline battery separator of the present invention is preferably 30 to 100 $g/m^2$, more preferably 40 to 80 $g/m^2$. If the mass per unit area is less than 30 $g/m^2$, a sufficient tensile strength may not be obtained. If the mass per unit area is more than 100 $g/m^2$, the separator becomes too thick to obtain a battery with a high capacity.

The alkaline battery separator of the present invention can be used as a separator of an alkaline primary battery, such as an alkaline-manganese battery, a mercury battery, a silver oxide battery, an air battery, or the like, or an alkaline secondary battery, such as a nickel-cadmium battery, silver-zinc battery, silver-cadmium battery, nickel-zinc battery, nickel-hydrogen battery or the like, particularly a separator of a nickel-cadmium battery or nickel-hydrogen battery.

EXAMPLES

The present invention now will be further illustrated by, but is by no means limited to, the following Examples.

Example 1

A fiber web was formed from a slurry prepared by mixing and dispersing 30 mass % of polypropylene high-strength fibers [tensile strength=9 g/d, fineness=2 denier (fiber diameter=17.7 μm), fiber length=10 mm, melting point= 160° C.] and 70 mass % of sheath-core type fusible fibers [fineness=1.1 denier (fiber diameter=13.1 μm), fiber length= 10 mm] containing a polypropylene core component (melting point=157° C.) and a low-density polyethylene sheath component (melting point=115° C.) by a wet-laid method.

The fiber web was heated at 120° C. without pressure for 10 seconds, and passed through calendering rolls under a linear pressure of 9.8 N/cm, to fuse only the low-density polyethylene component in the sheath-core type fusible fibers and prepare a non-woven fabric.

Then, the non-woven fabric was placed in a container filled with a gas mixture containing fluorine (3 vol %), oxygen (5 vol %), sulfur dioxide (5 vol %), and nitrogen (87 vol %) gases, and brought into contact with the gas mixture for 120 seconds to impart a hydrophilic property. An alkaline battery separator (mass per unit area=60 $g/m^2$, thickness= 0.15 mm) of the present invention was obtained.

Example 2

The non-woven fabric was prepared as in Example 1, and dipped in a solution of fuming sulfuric acid (15% $SO_3$ solution) at 39° C. for 10 minutes to impart a hydrophilic property. An alkaline battery separator (mass per unit area= 60 $g/m^2$, thickness=0.15 mm) of the present invention was obtained.

Example 3

The non-woven fabric was prepared as in Example 1, and then dipped in the graft-polymerizing liquid as described below, and irradiated in air for 15 seconds with ultraviolet light having a central wavelength of 365 nm at a light intensity of 180 mW/cm$^2$, by metal halide mercury vapor lamps. A lamp was located for an obverse side, and another lamp was located for a reverse side. Thereafter, the non-woven fabric was sandwiched between two gas-nonpermeable films so that air remaining in the inner spaces and the spaces around the outer surfaces of the non-woven fabric did not escape. Then, the non-woven fabric was irradiated for 15 seconds with ultraviolet light having a central wavelength of 365 nm at a light intensity of 180 mW/cm$^2$, by metal halide mercury vapor lamps. A lamp was located for an obverse side, and another lamp was located for a reverse side. When the irradiation with ultraviolet light was carried out under the condition that the non-woven fabric was sandwiched between the gas-nonpermeable films, the temperature of the non-woven fabric was 110° C., and the graft-polymerizing liquid was able to evaporate and diffuse from the edges of two gas-nonpermeable films. Then the non-woven fabric was thoroughly rinsed with water and dried, to obtain an alkaline battery separator (mass per unit area=65 g/m$^2$, thickness=0.15 mm) of the present invention. In the alkaline battery separator, acrylic acid monomers were polymerized at 7.7% with respect to the non-woven fabric.

| Composition of the graft-polymerizing liquid | |
|---|---|
| (1) acrylic acid monomer: | 25 mass % |
| (2) benzophenone: | 0.3 mass % |
| (3) iron sulfate: | 0.4 mass % |
| (4) nonionic surface active agent: | 3 mass % |
| (5) water: | 61.3 mass % |
| (6) polyethylene glycol (polymerization degree: 400): | 10 mass % |

Example 4

The procedures of forming a fiber web and a non-woven fabric, and treating with the fluorine gas disclosed in Example 1 were repeated, except that 40 mass % of the polypropylene high-strength fibers used in Example 1 and 60 mass % of the sheath-core type fusible fibers used in Example 1 were used, to obtain an alkaline battery separator (mass per unit area 60 g/m$^2$, thickness=0.15 mm) of the present invention.

Example 5

Thirty mass % of the polypropylene high-strength fibers used in Example 1 except that the fiber length thereof is 45 mm, and 70 mass % of the sheath-core type fusible fibers used in Example 1 except that the fiber length thereof is 38 mm were carded by a carding machine to form a fiber web. Then, the procedures of forming a non-woven fabric and treating with the fluorine gas disclosed in Example 1 were repeated, to obtain an alkaline battery separator (mass per unit area=60 g/m$^2$, thickness=0.15 mm) of the present invention.

Example 6

The procedures of forming a fiber web and a non-woven fabric, and treating with the fluorine gas disclosed in Example 1 were repeated, except that 5 mass % of the polypropylene high-strength fibers used in Example 1 and 95 mass % of the sheath-core type fusible fibers used in Example 1 were used, to obtain an alkaline battery separator (mass per unit area=60 g/m$^2$, thickness=0.15 mm) of the present invention.

Example 7

The procedures of forming a fiber web and a non-woven fabric, and treating with the fluorine gas disclosed in Example 1 were repeated, except that 60 mass % of the polypropylene high-strength fibers used in Example 1 and 40 mass % of the sheath-core type fusible fibers used in Example 1 were used, to obtain an alkaline battery separator (mass per unit area=60 g/m$^2$, thickness=0.15 mm) of the present invention.

Comparative Example 1

A fiber web was formed from 35 mass % of the polypropylene high-strength fibers used in Example 1, 25 mass % of the sheath-core type fusible fibers used in Example 1, and 40 mass % of orange-type dividable fibers [fineness=2 denier, fiber length=10 mm; dividable into 8 polypropylene fine fibers (sectional shape=approximate triangle; fiber diameter=4.4 µm, melting point 160° C.) and 8 low-density polyethylene fine fibers (sectional shape=approximate triangle; fiber diameter=4.3 µm, melting point=115° C.)] by a wet-laid method.

The fiber web was mounted on a plain weave net (mesh opening=0.175 mm), and then the fibers were entangled and the dividable fibers were divided to generate fine fibers with a water jet from a nozzle plate (nozzle diameter=0.15 mm, pitch=0.8 mm, inner pressure=12 MPa). In this case, each side of the fiber web was treated twice with the water jet The fiber web was dried to form an entangled non-woven fabric. The fusing treatment of the entangled non-woven fabric was carried out as in Example 1, that is, the low-density polyethylene component in the sheath-core type fusible fibers and the low-density polyethylene fine fibers were fused to obtain a fused non-woven fabric. Then, the treatment with the fluorine gas was carried out as in Example 1 to obtain a separator (mass per unit area=60 g/m$^2$, thickness=0.15 mm) for comparison.

Comparative Example 2

The procedures of forming a fiber web and a fused non-woven fabric, and treating with the fluorine gas disclosed in Comparative Example 1 were repeated, except that 60 mass % of the sheath-core type fusible fibers used in Example 1 and 40 mass % of the dividable fibers used in Comparative Example 1 were used, to obtain an alkaline battery separator (mass per unit area=60 g/m$^2$, thickness=0.15 mm) for comparison.

Evaluation of Properties
(1) Lengthwise Tensile Strength

Each of the separators cut to 50 mm width was set between chucks (distance between the chucks=100 mm) of a tensile tester (TENSILON UTM-III-100; manufactured by ORIENTEC, Co.), and a lengthwise tensile strength thereof was measured (pulling rate=300 mm/min). The results are shown in Table 1. As shown in Table 1, the alkaline battery separators of the present invention had an excellent tensile strength, and thus were not broken by the tension generated during battery assembly.
(2) Puncturing Force A laminate having a thickness of about 2 mm was formed from each of the separators. A stainless steel jig (thickness= 0.5 mm; angle of the blade edge=60°) mounted on a handy-type compression tester (KES-G5; manufactured by KATO TECH Co., Ltd.) was thrust perpendicularly into the laminate from the top separator at a rate of 0.01 cm/s, and the force required to cut the top separator was measured. The results are shown in Table 1. As apparent, it is difficult to puncture the alkaline battery separators of the present invention. Therefore, a battery can be produced in a good yield without the occurrence of a short circuit.

(3) Ratio of Maintaining Thickness

A thickness of each of the separators at a load of 500 g was measured by a micrometer (diameter of a spindle=6.35 mm). Then, the thickness of each of the separators at a load of 1100 g was measured by the micrometer. The thickness at a load of 1100 g is represented by the percentage with respect to the thickness at a load of 500 g. The results are shown in Table 1. As is apparent, the thickness of the alkaline battery separators of the present invention is not easily changed even if a pressure is applied. A pressure applied during the assembly of the electrodes-group will rarely crush the separator, and a short circuit rarely occurs. The shape of the separator can be maintained against an expansion or contraction of electrodes during a charging or discharging of a secondary battery, particularly against the expansion during the charging of the electrodes. It is expected that a battery with a long lifetime be produced, because dry-out rarely occurs and a short circuit rarely occurs.

(4) Lengthwise Bending Resistance

The lengthwise bending resistance of each of the separators was measured in accordance with JIS L 1096 [bending resistance; the A method]. The results are shown in Table 1. As shown in Table 1, the alkaline battery separators of the present invention have an excellent bending resistance, and thus show an excellent workability during the assembly of the electrodes-group.

(5) Lengthwise Tear Strength

The lengthwise tear strength of each of the separators was measured in accordance with JIS L 1096 (a method for testing general textiles; trapezoidal tearing strength test). The results are shown in Table 1. As shown in Table 1, the alkaline battery separators of the present invention have an excellent tear strength, and thus are not easily torn by the edge of the electrode. Therefore, a battery can be produced in a good yield.

(6) Ratio of Non-conforming Batteries Produced During the Battery Assembly

A homogenous alloy was produced in an arc smelting furnace, after accurately weighing lanthanum (La) with a purity of 99.5% or more, nickel (Ni) with a purity of 99.5% or more, cobalt (Co) with a purity of 99.5% or more, manganese (Mn) with a purity of 99.5% or more, and a mesh metal (Mm) containing 98% or more of rare earth elements so that a resulting alloy has an alloy composition of $La_{0.2}Mm_{0.8}Ni_{3.8}Co_{0.8}Mn_{0.4}$ as a hydrogen occlusion alloy. The resulting alloy was heated at 1000° C. for 6 hours under vacuum, and then pulverized into powder of 400 mesh or less. To 100 g of the resulting powder was added 25 g of an aqueous solution of 2% by weight of polyvinyl alcohol, to obtain a slurry paste. An expanded porous nickel (size=260× 38 mm; thickness=0.9 mm; porosity=95 to 96%) was uniformly filled with the resulting paste, dried, pressed at 500 kg/cm$^2$, and then equipped with a nickel lead wire by spot welding to form a negative electrode. On the other hand, an expanded nickel positive electrode (size=214×38 mm, thickness=0.68 to 0.7 mm, theoretical electrical quantity= 3060 to 3100 mAh) was prepared, as a nickel oxide electrode, in accordance with a conventional method. Thereafter, each of the separators was cut into a specimen of 43×560 mm, and placed between the positive electrode and the negative electrode. The whole was then rolled to obtain a sealed-type nickel-hydrogen secondary battery having a C-size.

Subsequently, for the resulting sealed-type nickel-hydrogen secondary batteries, a ratio of non-conforming batteries was determined in accordance with a criterion that a battery which shows an electrical resistance of 1 kΩ or less, when 240 V is applied between the positive and negative electrodes, should be rejected. The ratio was calculated from 10,000 assemblies of the sealed-type nickel-hydrogen secondary batteries in accordance with the above-mentioned method. The results are shown in Table 1. As apparent from Table 1, an alkaline battery can be effectively produced with a good yield, when the alkaline battery separator of the present invention is used.

TABLE 1

|  | A | B | C | D | E | F |
|---|---|---|---|---|---|---|
| Example 1 | 176 | 900 | 100 | 28 | 5.5 | 0.2 |
| Example 2 | 147 | 900 | 98 | 25 | 3.8 | 0.3 |
| Example 3 | 176 | 900 | 102 | 30 | 5.5 | 0.2 |
| Example 4 | 176 | 975 | 105 | 28 | 5.5 | 0.1 |
| Example 5 | 225 | 900 | 102 | 28 | 7.5 | 0.5 |
| Example 6 | 196 | 750 | 95 | 29 | 7.0 | 0.6 |
| Example 7 | 98 | 1013 | 105 | 25 | 4.0 | 0.4 |
| Comparative Example 1 | 147 | 900 | 88 | 15 | 3.1 | 0.7 |
| Comparative Example 2 | 185 | 700 | 88 | 15 | 3.3 | 1.5 |

[In Table 1, "A" denotes a tensile strength (unit=N/5 cm width), "B" denotes a penetrating force (unit=kgf), "C" denotes a ratio of maintaining thickness (unit=%), "D" denotes a bending resistance (unit=mg), "E" denotes a tear strength (unit=kg/5 cm width), and "F" denotes a ratio of non-conforming batteries produced during the battery assembly (unit=%).]

Example 8

A fiber web was formed from a slurry prepared by mixing and dispersing 40 mass % of polypropylene high-strength fibers [tensile strength 12 g/d, fineness=1.2 denier (fiber diameter=13.7 μm), fiber length=5 mm, melting point=166° C., sectional shape=circular] and 60 mass % of sheath-core type fusible fibers (fineness=0.7 denier (fiber diameter=10.3 μm), fiber length=5 mm; rate of the sheath component with respect to the fiber surface=100%, sectional shape=circular] containing a polypropylene core component (melting point= 160° C.) and a low-density polyethylene sheath component (melting point=110° C.) by an inclined long-wire type method. The fiber web was dried at 135° C., and at the same time, the sheath component in the sheath-core type fusible fibers was fused to obtain a fused non-woven fabric (mass per unit area=62 g/m$^2$, thickness 0.25 mm). When the fiber web was laid, a moving rate of a net for laying fibers and an amount of a slurry flow was adjusted to unidirectionally orientate fibers. Therefore, the ratio of a lengthwise tensile strength and a crosswise tensile strength of the fused non-woven fabric became 2:1. The term "tensile strength" as used herein with regard to a separator or fiber sheet, such as a non-woven fabric, means a force required to break a sample (fused non-woven fabric) cut to a 5 cm width, when the sample is set between chucks (distance between the chucks=100 mm) of a tensile tester (TENSILON UTM-III-100; manufactured by ORIENTEC, Co.) and pulled at a pulling rate of 300 mm/min.

Then, the fused non-woven fabric was passed through rolls at 95° C. to cause a pressure-fusing of the sheath component in the sheath-core type fusible fibers to obtain a pressure-fused non-woven fabric (thickness=0.2 mm). Sulfonic acid groups were introduced into fibers forming the pressure-fused non-woven fabric by dipping the fabric in a solution of fuming sulfuric acid (concentration=15%) at 60° C. for 2 minutes to obtain a sulfonated non-woven fabric. The thickness of the sulfonated non-woven fabric was adjusted by calendering at an ordinary temperature to obtain an alkaline battery separator (mass per unit area=62 g/m², thickness=0.13 mm) of the present invention.

Example 9

A fiber web was formed from a slurry prepared by mixing and dispersing 20 mass % of polypropylene high-strength fibers [tensile strength=12 g/d, fineness=2 denier (fiber diameter=17.6 μm), fiber length=10 mm, melting point=166° C., sectional shape=circular] and 80 mass % of sheath-core type fusible fibers [fineness=1.1 denier (fiber diameter=13.1 μm), fiber length=10 mm; rate of the sheath component with respect to the fiber surface=100%, sectional shape=circular] containing a polypropylene core component (melting point=160° C.) and a low-density polyethylene sheath component (melting point=110° C.) by an inclined long-wire type method. The fiber web was dried at 135° C., and at the same time, the sheath component in the sheath-core type fusible fibers was fused to obtain a fused non-woven fabric (mass per unit area 54 g/m², thickness=0.25 mm). When the fiber web was laid, a moving rate of a net for laying fibers and an amount of a slurry flow was adjusted to unidirectionally orientate fibers. Therefore, the ratio of a lengthwise tensile strength and a crosswise tensile strength of the fused non-woven fabric became 2:1.

A Then, the fused non-woven fabric was passed through rolls at 95° C. to cause a pressure-fusing of the sheath component in the sheath-core type fusible fibers to obtain a pressure-fused non-woven fabric (thickness=0.2 mm). The pressure-fused non-woven fabric was dipped in the graft-polymerizing liquid as described below (80 amounts of the liquid with respect to 100 amounts of a mass per unit area of the pressure-fused non-woven fabric), and irradiated in air for 15 seconds with ultraviolet light having a central wavelength of 365 nm at a light intensity of 180 mW/cm², by metal halide mercury vapor lamps located on both sides of the pressure-fused non-woven fabric, respectively. That is, a lamp was located for an obverse side, and another lamp was located for a reverse side. Thereafter, the pressure-fused non-woven fabric irradiated with ultraviolet light was sandwiched between two gas-nonpermeable films so that air remaining in the inner spaces and the spaces around the outer surfaces of the non-woven fabric did not escape, and irradiated for 15 seconds with ultraviolet light having a central wavelength of 365 nm at a light intensity of 180 mW/cm², by a metal halide mercury vapor lamp located on both sides of the pressure-fused non-woven fabric irradiated with ultraviolet light, respectively, as above, to obtain a graft-polymerized non-woven fabric (graft ratio=10%). When the irradiation with ultraviolet light was carried out under the condition that the non-woven fabric was sandwiched between the gas-nonpermeable films, the temperature of the non-woven fabric was 110° C., and the graft-polymerizing liquid was able to evaporate and diffuse from the edges of two gas-nonpermeable films. The thickness of the graft-polymerized non-woven fabric was adjusted by calendering at an ordinary temperature to obtain an alkaline battery separator (mass per unit area=60 g/m², thickness=0.13 mm) of the present invention.

| Composition of the graft-polymerizing liquid | |
|---|---|
| (1) acrylic acid monomer: | 25 mass % |
| (2) benzophenone: | 0.3 mass % |
| (3) iron sulfate: | 0.4 mass % |
| (4) nonionic surface active agent: | 3 mass % |
| (5) water: | 71.3 mass % |

Evaluation of Properties (1) Maximum Pore Diameter

The maximum pore diameter of each of the separators of the present invention prepared in Examples 8 and 9 was measured in accordance with a bubble point method using a porometer Coulter Electronics Ltd. The results are shown in Table 2.

(2) 5% Modulus Strength

Each of the separators of the present invention prepared in Examples 8 and 9 was cut to a 50 mm width, and set between chucks (distance between the chucks=10 cm) of a tensile tester (TENSILON UTM-III-100; manufactured by ORIENTEC, Co.), and a force required to extend the separator by 5 mm (pulling rate=300 mm/min) was measured. The results are shown in Table 2.

(3) Ratio of Pores Having a Pore Diameter of 30 μm or Less With Respect to the Whole Pores For each of the separators of the present invention prepared in Example 8 and Example 9, the ratio of pores having a pore diameter of 30 μm or less with respect to the whole of pores was calculated by measuring a pressure of gas (nitrogen gas) in accordance with a bubble point method, calculating a pore diameter in accordance with a Washburn equation, and obtaining a distribution of the pore diameter from a flow of the gas. The results are shown in Table 2.

(4) Air Permeability

The air permeability of each of the separators of the present invention prepared in Examples 8 and 9 was measured in accordance with the method defined in JIS L 1096 (1999) [8.27.1 A method (Frazir method)]. The results are shown in Table 2.

(5) Electrical Resistance

For each of the separators of the present invention prepared in Examples 8 and 9, the "electrical resistance" was determined in accordance with the procedures as mentioned below, using a test equipment disclosed in JIS C2313 (Separator for a lead secondary battery), 7.2.4 Electrical Resistance, 3. Test Equipment. Specifically, a potassium hydroxide solution having a specific gravity of 1.3 (measured at 20° C.) was introduced into the test equipment, i.e., a test battery container. A resistance R was determined by passing a direct current of 1A between the current electrodes while the temperature was maintained at 25±0.5° C. in a constant-temperature bath, and measuring a voltage drop due to a liquid resistance by a voltage indicator. Then, three specimens cut from the separator to be examined were placed in a position where a specimen is placed, a resistance $R_1$ was determined by measuring a voltage drop according to the above-mentioned method. An electrical resistance $R_0$ was calculated from the equation (I):

$$R_0 = (R_1 - R)/(5 \times 3) \qquad (I)$$

wherein $R_0$ is an electrical resistance (unit=mΩ·100 cm²/sheet) of the separator to be examined, $R_1$ is a resistance (unit=mΩ) obtained when the separator to be examined was placed, and R is a resistance (unit=mΩ) obtained when the separator to be examined was not placed.

The specimen used was cut from approximately central portion of the separator to be examined, and had a size of about 70×70 mm. The specimen was dipped in a potassium hydroxide solution (specific gravity=1.3 at 20° C.) at 25±2° C. for 5 hours before the above test procedures. When a separator to be examined was too small to prepare a specimen of about 70×70 mm, a specimen was prepared from the original separator at a rate of one specimen per about 400 cm². As the current electrode in the test equipment, a nickel plate (length=70 mm, width=70 mm, thickness=1 mm) composed of one or more kinds of nickel metals defined in JIS H2105 (nickel metal) was used. The voltage electrode used was prepared by dipping a cadmium bar (diameter= about 5 mm, length=about 50 mm or more) composed of one kind of a cadmium metal defined in JIS H 2113 in potassium hydroxide (specific gravity=1.3 at 20° C.) at an ordinary temperature for 24 hours or more. The test battery container used was an alkali-resistant vessel. When a space was generated upon which the specimens were placed, the measurement was carried out after the specimens were fixed by an alkali-resistant fixing spacer having a shape the same as that of the position where a specimen is placed. In this case, the resistance in the absence of the separator to be examined was measured, while the alkali-resistant fixing spacer was inserted.

The results are shown in Table 2.

(6) Ratio of Maintaining Thickness and Ratio of Non-conforming Batteries Produced During the Battery Assembly The separators of the present invention prepared in Examples 8 and 9 were examined for a ratio of maintaining thickness and a ratio of non-conforming batteries produced during the battery assembly in accordance with the methods as described above, respectively. The results are shown in Table 2.

TABLE 2

|  | C | F | G | H | J | K | L |
| --- | --- | --- | --- | --- | --- | --- | --- |
| Example 8 | 105 | 0.1 | 43 | 90 | 98 | 15 | 0.0015 |
| Example 9 | 102 | 0.5 | 45 | 74 | 97 | 25 | 0.0010 |

[In Table 2, "C" denotes a ratio of maintaining a thickness (unit=%), "F" denotes a ratio of non-conforming batteries produced during the battery assembly (unit=%), "G" denotes a maximum pore size (unit=μm), "H" denotes a 5% modulus strength (unit=N/5 cm width), "J" denotes a ratio of pores having a pore size of 30 μm or less in the whole pores (unit=%), "K" denotes an air permeability (unit=cm/sec), and "L" denotes an electrical resistance (unit=mΩ·100 cm²/sheet)]

INDUSTRIAL APPLICABILITY

In the alkaline battery separator of the present invention, a short circuit caused by a puncturing of the separator due to the occurrence of a flash on the electrode is avoided, and the separator is prevented from being torn by an edge of an electrode, and further a good workability is provided, and the separator is not wrinkled. Therefore, a battery can be stably produced in a good yield. The alkaline battery separator of the present invention has an excellent property required to diffuse a poured electrolyte.

As above, the present invention was explained with reference to particular embodiments, but modifications and improvements obvious to those skilled in the art are included in the scope of the present invention.

What is claimed is:

1. An alkaline battery separator comprising a fiber sheet comprising more than 75 mass percentage of hydrophilicity-imparted polyolefin fibers having a fiber diameter of 9 μm or more, based upon 100% total weight of constituent fibers of the fiber sheet, wherein a part of said hydrophilicity-imparted polyolefin fibers is comprised of fibers having a tensile strength of at least 5 g/d.

2. The alkaline battery separator according to claim 1, wherein said fiber sheet contains fibers having a tensile strength of 5 g/d or more and fusible fibers, as said hydrophilicity-imparted polyolefin fibers having a fiber diameter of at least 9 μm.

3. The alkaline battery separator according to claim 2, wherein the mass ratio of non-fusible fibers having a tensile strength of at least 5 g/d and said fusible fibers is 10:90 to 50:50.

4. The alkaline battery separator according to claim 1, wherein the maximum pore diameter of said fiber sheet is less than 50 μm.

5. The alkaline battery separator according to claim 1, wherein a 5% modulus strength with respect to at least a direction of said fiber sheet is at least 60 N/5 cm width.

6. The alkaline battery separator according to claim 1, wherein pores having a pore diameter of at least 30 μm in said fiber sheet accounts for at least 95% of the whole of pores.

7. The alkaline battery separator according to claim 1, wherein an air permeability of said fiber sheet is at least 4 cm/sec.

8. The alkaline battery separator according to claim 1, wherein an electrical resistance of said fiber sheet is less than 5 mΩ·100 cm²/sheet.

9. The alkaline battery separator according to claim 1, wherein polyethylene fibers whose surface consists substantially of a polyethylene resin account for at least 60 mass % of said hydrophilicity-imparted polyolefin fibers which are the major component of said fiber sheet.

10. The alkaline battery separator according to claim 1, wherein said fiber sheet is a non-woven fabric.

11. A process for producing an alkaline battery separator comprising a fiber sheet comprising more than 75 mass percentage of hydrophilicity-imparted polyolefin fibers having a fiber diameter of at least 9 μm, comprising steps of: forming a fiber sheet from polyolefin fibers which have a fiber diameter of at least 9 μm, said polyolefin fibers containing polyolefin fibers having a fiber diameter of at least 9 μm and a tensile strength of at least 5 g/d; and then imparting a hydrophilic property to the resulting fiber sheet.

* * * * *